(12) United States Patent
Tatarliov

(10) Patent No.: US 6,702,036 B1
(45) Date of Patent: Mar. 9, 2004

(54) CULTIVATOR SHOVEL

(76) Inventor: Ken Tatarliov, Box 155, Minton Saskatchewan (CA), S0C 1T0

( * ) Notice: Subject to any disclaimer, the term of this patent is extended or adjusted under 35 U.S.C. 154(b) by 219 days.

(21) Appl. No.: 10/098,445

(22) Filed: Mar. 18, 2002

(51) Int. Cl.$^7$ .............................................. A01B 39/20
(52) U.S. Cl. ..................................... 172/724; 172/730
(58) Field of Search ................................ 172/724, 730, 172/745, 706

(56) References Cited

U.S. PATENT DOCUMENTS

| | | | | |
|---|---|---|---|---|
| 152,201 A | * | 6/1874 | Warinner | 172/369 |
| 200,755 A | * | 2/1878 | Pirkle | 172/218 |
| 309,671 A | * | 12/1884 | Williams | 172/724 |
| 422,718 A | * | 3/1890 | Cameron | 172/730 |
| 457,198 A | * | 8/1891 | Harvey | 172/351 |
| 709,147 A | | 9/1902 | Fay | |
| 1,381,028 A | * | 6/1921 | Stevenson | 172/724 |
| 1,533,825 A | * | 4/1925 | Burnett | 172/193 |
| 1,648,843 A | * | 11/1927 | Francis | 172/730 |
| 1,946,006 A | * | 2/1934 | Struckmeyer | 172/375 |
| 2,558,154 A | * | 6/1951 | Porter | 172/195 |
| 2,563,177 A | * | 8/1951 | Lilley et al. | 171/83 |
| 2,644,387 A | * | 7/1953 | Kamplade | 172/156 |
| 2,768,591 A | * | 10/1956 | James | 307/650 |
| 2,925,056 A | * | 2/1960 | Wade | 111/152 |
| 3,152,649 A | * | 10/1964 | Arnold | 172/192 |
| 4,047,577 A | | 9/1977 | Tibbs, II | |
| 4,077,479 A | * | 3/1978 | Tibbs | 172/509 |
| 4,129,082 A | * | 12/1978 | Betulius | 111/123 |
| 4,560,011 A | * | 12/1985 | Peterson et al. | 172/194 |
| 5,531,277 A | | 7/1996 | Noonan et al. | 172/130 |
| 5,540,288 A | * | 7/1996 | Dietrich, Sr. | 172/166 |
| 6,382,115 B1 | * | 5/2002 | Collovati | 111/152 |

FOREIGN PATENT DOCUMENTS

GB  2142414  * 2/1985 ........... A01B/35/20

* cited by examiner

Primary Examiner—Thomas B. Will
Assistant Examiner—Kristine Florio
(74) Attorney, Agent, or Firm—Ryan W. Dupuis; Adrian D. Battison; Michael R. Williams

(57) ABSTRACT

A cultivator shovel for mounting on one of the shanks of a conventional agricultural cultivator. The shovel includes a shank mount in the form of a channel for receiving the shank therein. A shovel body is supported on a lower end of the shank mount and includes a leading edge extending rearwardly and outwardly from opposing sides of a forward apex to respective rearward free ends of the shovel body. A pair of upright end plates are mounted on the shovel body adjacent the respective rearward free ends. The end plates prevent deflection of weeds about the free ends of the shovel body when the shovel is used for weeding, thus forcing the weeds to be broken on the leading edge of the shovel body or on the end plates for more effective weeding using a cultivator. Furthermore, soil disturbance is increased dramatically using the end plates, and as a result, shallow rooted weeds such as millet die.

20 Claims, 2 Drawing Sheets

CULTIVATOR SHOVEL

FIELD OF THE INVENTION

The present invention relates to a shovel for being supported on the implement shank of an agricultural cultivator.

BACKGROUND

The use of cultivators is known in agriculture for killing weeds by disturbing the soil and breaking the weeds at the root. A common type of cultivator includes a plurality of implement shanks projecting downwardly and forwardly therefrom towards the ground for supporting a plurality of cultivator shovels or sweeps respectively thereon. The shovels generally include a laterally extending leading edge arranged to be pulled through the ground just below a surface of the ground for disturbing the soil and breaking the weeds at the roots. When using common cultivator shovels, several passes are often required as many weeds are not successfully destroyed because they are known to be deflected around the shovels by the disturbed soil instead of being forced over the shovel when the cultivator is pulled across the ground.

U.S. Pat. No. 1,946,006 to Struckmeyer; U.S. Pat. No. 709,147 to Fay and U.S. Pat. No. 5,531,227 to Noonan et al disclose variations to shovels or weeding-type implements, however none appear particularly suited for effective weeding on the implement shank of a cultivator. U.S. Pat. No. 4,047,577 to Tibbs discloses a shovel which is intended for use on a cultivator to improve the effective soil disturbance when pulled through the ground. In addition to the forward facing apex of conventional shovels a pair of auxiliary wings are provided which project laterally outwardly and forwardly from the shovel for engaging the ground in a more aggressive manner. Upright end plates are located at the outer free ends of the wings. The end plates however do not extend upwardly beyond a trailing edge of the plough and thus do not considerably affect soil disturbance by the shovel. Furthermore the forward projecting wings increase resistance to the cultivator being pulled through the ground and are readily susceptible to being broken due to the extreme forces of ground resistance being applied to the outer free ends of the shovel.

SUMMARY

According to a first aspect of the present invention there is provided a shovel for being supported on an implement shank of an agricultural implement supported for movement along the ground in a forward working direction, the shovel comprising:

a shank mount comprising an upright channel for receiving the implement shank therein;

a shovel body supported on a lower end of the shank mount having a leading edge extending rearwardly and outwardly from opposing sides of a forward apex to respective rearward free ends; and a pair of end plates mounted on the shovel body adjacent the respective rearward free ends, the end plates extending upwardly from the leading edge of the shovel body.

Providing a shovel body having a leading edge which extends rearwardly and outwardly from opposing sides of a forward apex, minimizes ground resistance when the cultivator is pulled across the ground. The location of the end plates at the free ends of the shovel body ensures that weeds are not readily deflected about the free ends of the shovel body by the disturbed soil being carried over the shovel body, but rather ensure that the weeds or the roots thereof are broken either on the leading edge of the shovel body or on the forward edge of the end plates as the end plates cut through the disturbed soil passing over the shovel body when oriented to extend upwardly from the leading edge at the free ends as described herein.

The use of end plates at the rearward free ends of the shovel body provides a clean kill when weeding as soil disturbance is increased dramatically and as a result shallow rooted weeds such as millet die. Also tap rooted plants such as tansy mustard don't slip around the end of the shovel, but are forced over the blade due to the soil action created by the end plates. This results in a savings of equipment as less wear and maintenance will be required, a savings of fuel and a savings of time because the increased weed kill percentage enables the same effective weeding by the cultivator in fewer passes of the cultivator over the field being required. Existing soil moisture may then be more readily conserved as a result of the soil being tilled fewer times. When the end plates are provided with a rearward incline, drag and plugging is discouraged so that uprooted weeds are deflected upwardly so as to be deposited near the surface of the soil.

Preferably, the end plates are substantially vertically oriented, parallel to the forward working direction and each including a leading edge extending upwardly at a rearward incline. The end plates are thus substantially perpendicular to a plane containing the leading edge of the shovel body.

The leading edges of the respective end plates may extend upwardly at a rearward incline which is substantially equal to a rearward and upward incline of the channel of the shank mount.

The end plates are preferably positioned substantially rearwardly of the shank mount.

When the shovel body includes a trailing edge opposite the leading edge, the end plates preferably extend upwardly past the trailing edge as well.

The end plates are preferably mounted on respective opposing outer sides of the shovel body to assist in preventing wear at the free ends of the shovel body. The end plates may be welded onto the shovel body for increased strength at the free ends of the shovel body. Alternatively, the end plates may be molded integrally with the shovel body for simplicity of manufacture.

The end plates may extend upwardly a height which is approximately equal to a height of the shank mount. The end plates still function sufficiently when extending upwardly a height which is at least half a height of the shank mount, but preferably the end plates extend upwardly a height which is equal to a full height of the shank mount or greater for optimum performance.

The end plates preferably extend upwardly from a lower end supported on the shovel body forwardly of the leading edge of the shovel body. With the lower end of the end plates projecting slightly forwardly from the leading edge of the shovel body, weeds are caught at the free ends of the shovel body and forced to be broken on the leading edge.

The leading edge of the shovel body may include a pair of end portions curving laterally outward away from each other at the rearward free ends of the shovel body, the end plates being supported on the respective end portions.

The shank mount preferably extends upwardly from the shovel body at a rearward incline for accommodating conventional implement shanks. The shank mount may further include a pair of mounting apertures therein for receiving respective fasteners for securement to the implement shank.

The shovel body also preferably extends upwardly at a rearward incline from the apex to the shank mount.

The channel of the shank mount preferably has a generally C-shaped cross-section including a forward face and a pair of side portions extending rearwardly from opposing sides of the forward face.

In combination with a cultivator having a plurality of implement shanks, the shovel is preferably supported on one of the shanks with said one of the shanks being received within the channel of the shank mount of the shovel.

BRIEF DESCRIPTION OF THE DRAWINGS

In the accompanying drawings, which illustrate an exemplary embodiment of the present invention.

DETAILED DESCRIPTION

Figure 1:
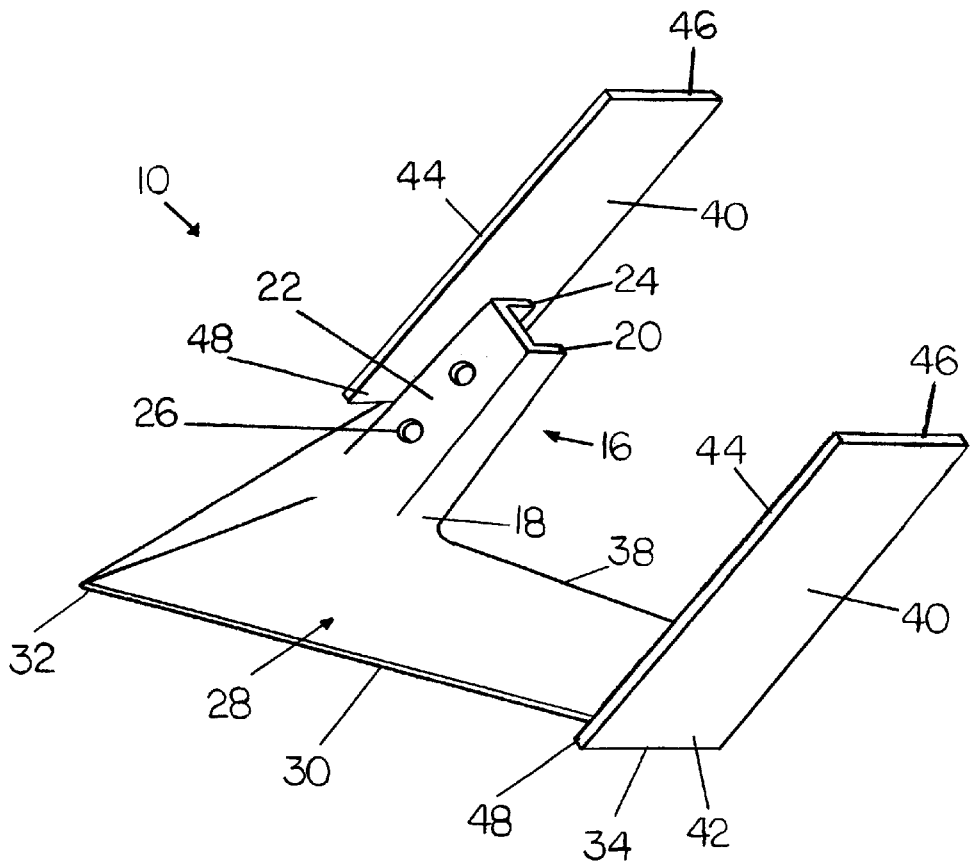
FIG. 1 is an isometric view of the shovel.
Figure 2:
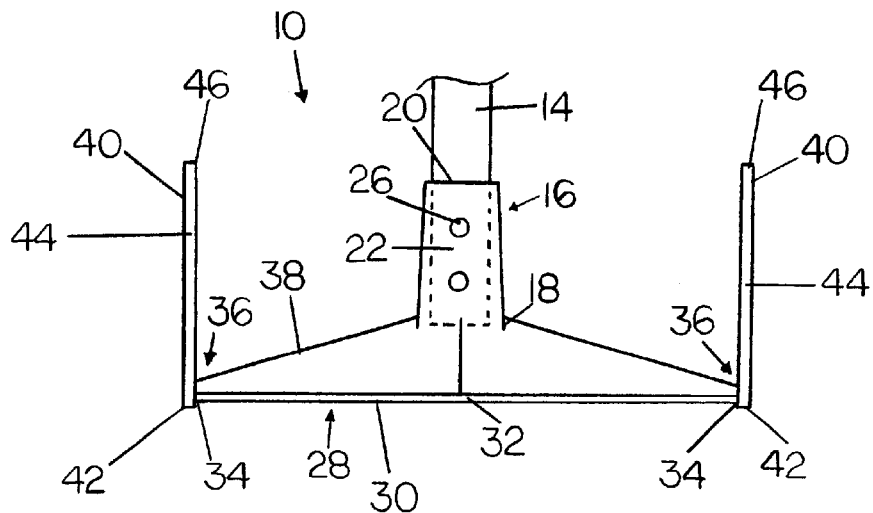
FIG. 2 is a front elevational view of the shovel.
Figure 3:
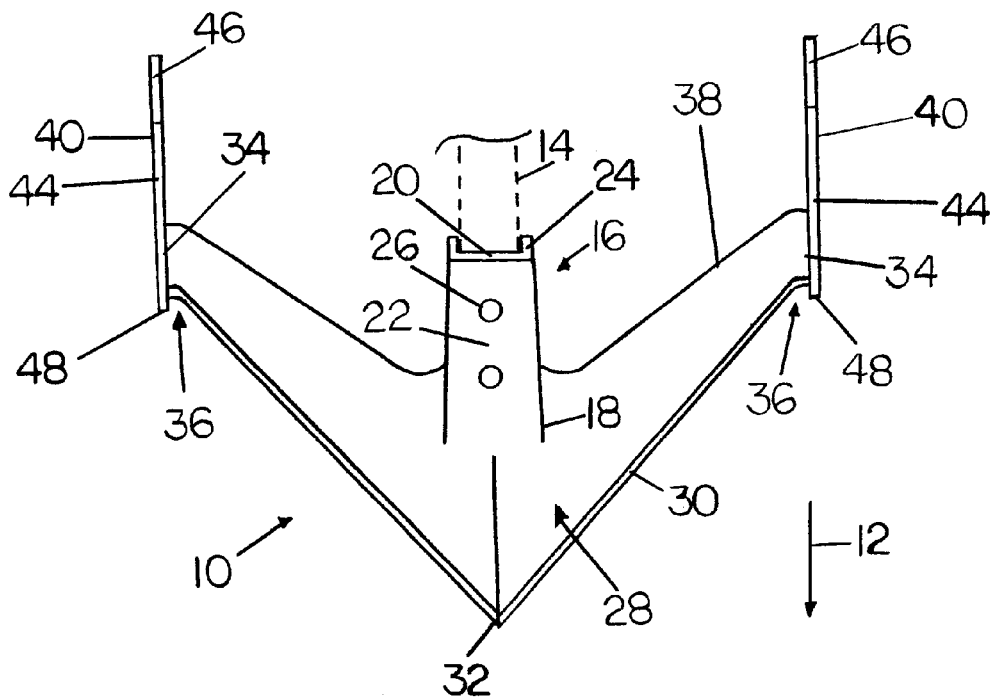
FIG. 3 is a top plan view of the shovel.
Figure 4:
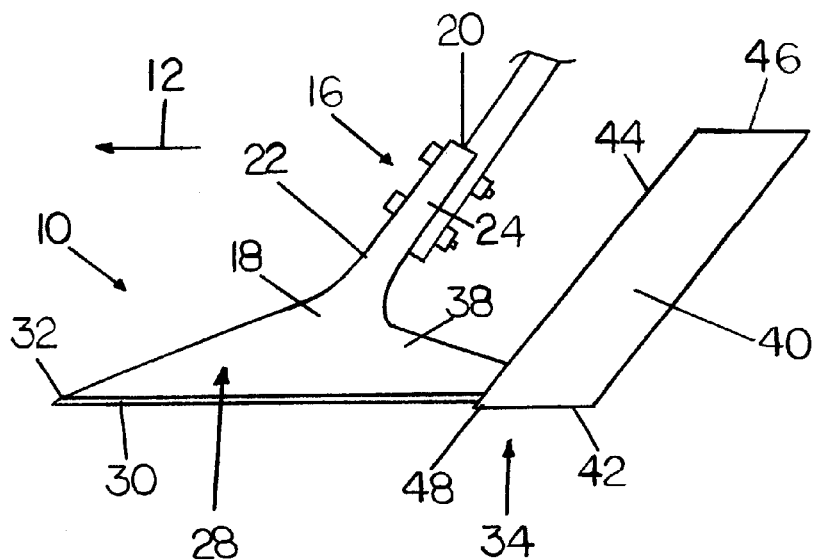
FIG. 4 is a side elevational view of the shovel.

Referring to the accompanying drawings, there is illustrated a shovel generally indicated by reference numeral 10. The shovel 10 is particularly suited for use on a cultivator arranged to be towed in a forward working direction 12 across the ground. The cultivator includes a plurality of implement shanks 14 which project downwardly and forwardly towards the ground. Each shank generally comprises a bar of rectangular cross section having suitable mounting apertures therein for mounting a conventional cultivator shovel or sweep thereon.

The shovel 10 includes a shank mount 16 which extends upwardly at a rearward incline from a bottom end 18 to a top end 20. The shank mount 16 is a channel having a generally C-shaped cross section adapted to receive the shank 14 therein. The channel of the shank mount 16 includes a front face 22 and a pair of sides 24 extending rearwardly from opposing sides of the front face for receiving the shank 14 therebetween.

A pair of mounting apertures 26 are located at vertically spaced positions in the front face 22 for receiving suitable fasteners therethrough for mounting the shank mount 16 on one of the implement shanks 14 of the cultivator.

The shovel 10 further includes a shovel body 28 which is substantially V-shaped, being supported on the lower end 18 of the shank mount. The shovel body includes a leading edge 30 having an apex 32 positioned forwardly of the lower end of the shank mount 16 in alignment therewith in the forward working direction. The leading edge 30 extends rearwardly and outwardly from opposing sides of the apex 32 to respective rearward free ends 34 which are located spaced laterally outwardly in a generally common plane with the apex 32. End portions 36 of the leading edge 30 are curved to extend laterally outwardly from one another before terminating at the rear free ends 34 of the leading edge.

An upper surface of the shovel body 28 is inclined upwardly and rearwardly from the leading edge 30 to the shank mount 16 at the trailing edge 38 of the shovel body. The shovel body 28 has a generally smooth upper surface with a hollow underside.

A pair of flat end plates 40 are supported on the outer sides of the rearward free ends 34 of the shovel body, being mounted to the shovel body 28 by a suitable weld bead. The end plates 40 extend upwardly from the shovel body in a vertical orientation parallel to the forward working direction 12. The end plates 40 thus lie substantially perpendicularly to the common plane of the leading edge 30. The end plates are secured at a bottom end 42 on the shovel body 28 at the rearward free ends 34, spanning between the leading edge 30 and the trailing edge 38.

A leading edge 44 of each end plate 40 extends upwardly at a rearward incline similar to the rearward incline of the shank mount 16 to a top end 46 of the plates 40. A resulting vertical height of the end plates 40 extends above a corresponding height of the shank mount 16 spaced well above both the leading and trailing edges of the shovel body, plural times the depth of the shovel body.

A depth of each end plate 40 in the working direction, between the leading and trailing edge thereof, is substantially identical to a depth of the shovel body, from the leading edge to the trailing edge thereof, at an intermediate position located between the shank mount and one of the free ends thereof. The depth of the end plates 40, in this arrangement, provides suitable strength to resist twisting in relation to the forward working direction. In preferred arrangements, the depth of the end plates is slightly greater than the shovel body to accommodate the forward projection at the lower end of the end plates which projects beyond the leading edge of the shovel body in the forward working direction.

When operating at a shovel depth of approximately four inches, for example, with expected soil disturbance in the order of two inches, the end plates 40 are arranged to have a height of at least six inches for optimum performance so as to at least project evenly or above the surface of the disturbed ground soil.

The bottom end 42 of the end plates 40 at the leading edge 44 thereof projects forwardly from the leading edge 30 of the shovel body at the end portions 36 thereof so that weeds and roots sliding along the leading edge 30 of the shovel body become caught on the forward projections 48 of the end plates as opposed to being deflected upwardly along the end plates causing the weeds or roots to be broken on the leading edge of the shovel body. The rearward incline of the leading edge of the end plates however encourages shallow rooted weeds to be deflected upwardly for depositing on the surface of the soil after the shovel has passed through the ground.

The location of the end plates 40 extending upwardly and rearwardly from the rear free ends 34 of the shovel body 28 ensures that the end plates 40 are located substantially rearwardly of the shank mount 16, laterally outwardly therefrom in the wake of already disturbed soil being deflected by the leading edge of the shovel body and the shank mount for controlling the soil disturbance of the shovel.

In further arrangements, the shovel may be formed in a single molding operation in place of welding the end plates to an existing shovel body. Further variations to the shovel design may include replacing the mounting apertures of the shank mount with a knock-on shank mount design that does not require fasteners.

While one embodiment of the present invention has been described in the foregoing, it is to be understood that other embodiments are possible within the scope of the invention. The invention is to be considered limited solely by the scope of the appended claims.

What is claimed is:

1. A shovel for being supported on an implement shank of an agricultural implement supported for movement along the ground in a forward working direction, the shovel comprising:

a shank mount comprising an upright channel for receiving the implement shank therein;

a shovel body supported on a lower end of the shank mount having a leading edge extending rearwardly and outwardly from opposing sides of a forward apex to respective rearward free ends; and a pair of end plates mounted on the shovel body adjacent the respective rearward free ends, the end plates being substantially parallel to the forward working direction and including a leading edge extending upwardly from the leading edge of the shovel body at a rearward incline which is substantially equal to a rearward and upward incline of the channel of the shank mount.

2. The shovel according to claim 1 wherein the pair of end plates are substantially perpendicular to a plane containing the leading edge of the shovel body such that the end plates are substantially vertically oriented.

3. The shovel according to claim 1 wherein the end plates are spaced rearwardly of the shank mount.

4. The shovel according to claim 1 wherein the shovel body includes a trailing edge opposite the leading edge, the end plates extending upwardly beyond the trailing edge.

5. The shovel according to claim 1 wherein the end plates are mounted on respective opposing outer sides of the shovel body.

6. The shovel according to claim 1 wherein the end plates and the shovel body are molded integrally with one another.

7. The shovel according to claim 1 wherein the end plates extend upwardly a height which is substantially equal to a height of the shank mount.

8. The shovel according to claim 1 wherein the end plates extend upwardly a height which is substantially equal to at least half a height of the shank mount.

9. The shovel according to claim 1 wherein the end plates extend upwardly from a lower end supported on the shovel body, the lower end extending partially forwardly from the leading edge of the shovel body.

10. A shovel for being supported on an implement shank of an agricultural implement supported for movement along the ground in a forward working direction, the shovel comprising:

a shovel body having a leading edge extending rearwardly and outwardly from opposing sides of a forward apex to respective rearward free ends;

a shank mount comprising an upright channel mounted on the shovel body to extend upwardly therefrom for receiving the implement shank therein; and a pair of end plates mounted on the shovel body adjacent the respective rearward free ends, the end plates including a leading edge extending upwardly at a rearward incline beyond the shovel body a height which is substantially a height of the shank mount or greater.

11. The shovel according to claim 10 wherein the end plates are substantially parallel to the forward working direction.

12. The shovel according to claim 10, wherein the channel of the shank mount extends upwardly from the shovel body at a rearward incline.

13. The shovel according to claim 10 wherein the shank mount includes a pair of mounting apertures therein for receiving respective fasteners therethrough.

14. The shovel according to claim 10 wherein the channel of the shank mount has a generally C-shaped cross-section including a forward face and a pair of side portions extending rearwardly from opposing sides of the forward face.

15. The shovel according to claim 10, wherein the shovel body extends upwardly at a rearward incline from the apex to the shank mount.

16. The shovel according to claim 10 wherein the leading edge of each end plate extends upwardly beyond the shovel body a height which is plural times a height of the shovel body.

17. A shovel for being supported on an implement shank of an agricultural implement supported for movement along the ground in a forward working direction, the shovel comprising:

a shank mount comprising an upright channel for receiving the implement shank therein;

a shovel body supported on a lower end of the shank mount having a leading edge extending rearwardly and outwardly from opposing sides of a forward apex to respective rearward free ends;

the leading edge of the shovel body including a pair of end portions curving laterally outward away from each other at the rearward free ends of the shovel body;

and a pair of end plates mounted on respective outer sides of the end portions of the shovel body and extending upwardly beyond the shovel body.

18. The shovel according to claim 17 wherein the end plates are welded onto the shovel body.

19. The shovel according to claim 17 wherein the end plates each include a leading edge extending upwardly at a rearward incline.

20. The shovel according to claim 19 wherein the leading edges of the respective end plates extend upwardly at a rearward incline which is substantially equal to a rearward and upward incline of the shank mount.

* * * * *